United States Patent [19]
Ball et al.

[11] Patent Number: 4,893,725

[45] Date of Patent: * Jan. 16, 1990

[54] METHODS OF MAKING METAL CAN ENDS WITH PLASTICS CLOSURES

[75] Inventors: Martin F. Ball, Wantage; Andrew P. Pavely, Blunsdon; Joseph S. Taylor, Long Wittenham, all of England

[73] Assignee: CMB Packaging (UK) Limited, Reading, England

[*] Notice: The portion of the term of this patent subsequent to Mar. 21, 2006 has been disclaimed.

[21] Appl. No.: 216,473

[22] Filed: Jul. 8, 1988

Related U.S. Application Data

[63] Continuation-in-part of Ser. No. 163,186, Feb. 25, 1988, Pat. No. 4,813,837, Continuation of Ser. No. 906,887, Sep. 15, 1986, abandoned.

[30] Foreign Application Priority Data

Sep. 20, 1985 [GB] United Kingdom ................ 8523263

[51] Int. Cl.$^4$ ............................................. B65D 17/34
[52] U.S. Cl. .................................... 220/269; 220/270; 220/271; 413/12; 413/25
[58] Field of Search ................... 220/66, 68, 260, 270, 220/271, 269; 413/12, 19, 25, 58, 60, 66, 16; 264/267, 268, 274

[56] References Cited

U.S. PATENT DOCUMENTS

| | | | |
|---|---|---|---|
| 4,170,314 | 10/1979 | Weierman et al. | 220/260 |
| 4,309,952 | 1/1982 | Takahishi et al. | 413/12 |
| 4,407,424 | 10/1983 | Heyn | 220/269 |
| 4,489,018 | 12/1984 | Ball | 264/274 |
| 4,576,306 | 3/1986 | Kelsey et al. | 220/271 |
| 4,674,649 | 6/1987 | Pavely | 220/271 |

FOREIGN PATENT DOCUMENTS 1393875 5/1975 United Kingdom .
2073646 10/1981 United Kingdom .

*Primary Examiner*—Stephen Marcus
*Assistant Examiner*—Nova Stucker
*Attorney, Agent, or Firm*—Diller, Ramik & Wight

[57] ABSTRACT

A method of making a metal can end with a tear-open plastics closure, for a can intended to be resistant to leakage when subject to internal pressures, such as arise from carbonation of a beverage or thermal processing, wherein the undersurface of the can end is provided with a plastics coating, and the can end is pierced to form an aperture with a peripheral downturned flange at an angle of 70° to 110° to the plane of the can end and having a flat end. A one-piece ring pull closure is injection-moulded onto the can end from a plastics material resistant to softening at up to at least 65° C., without additional heating of the metal, so as to fill the aperture, bond with the coating, and enclose the flange, with a residual thickness below the flange of 0.125 to 0.5 mm. The thickness of the plastics material of the closure is such that it can be sheared against the flange when the ring pull is pulled manually. The residual thickness of the plastics material may be varied around the aperture to increase resistance of the closure to creep, and the aperture may be pear-shaped or may be circular with a separate vent hole.

25 Claims, 13 Drawing Sheets

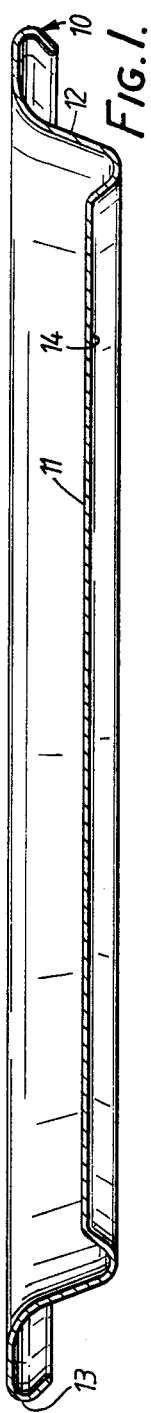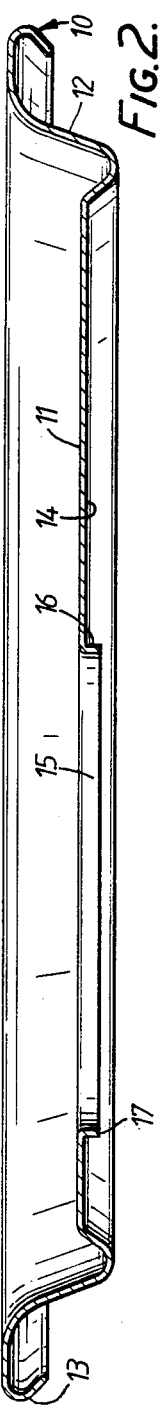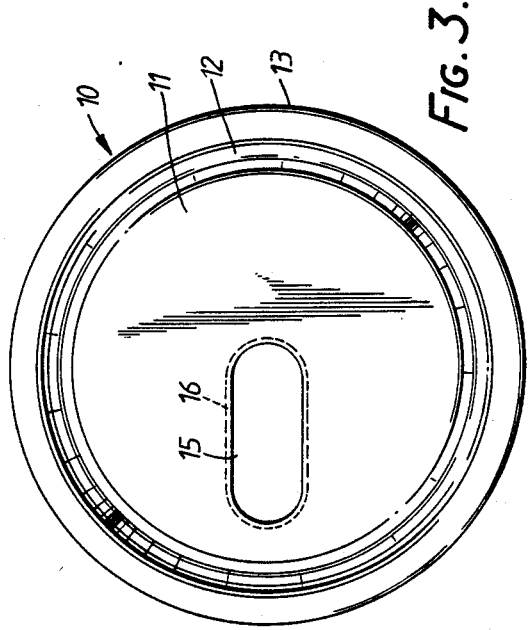

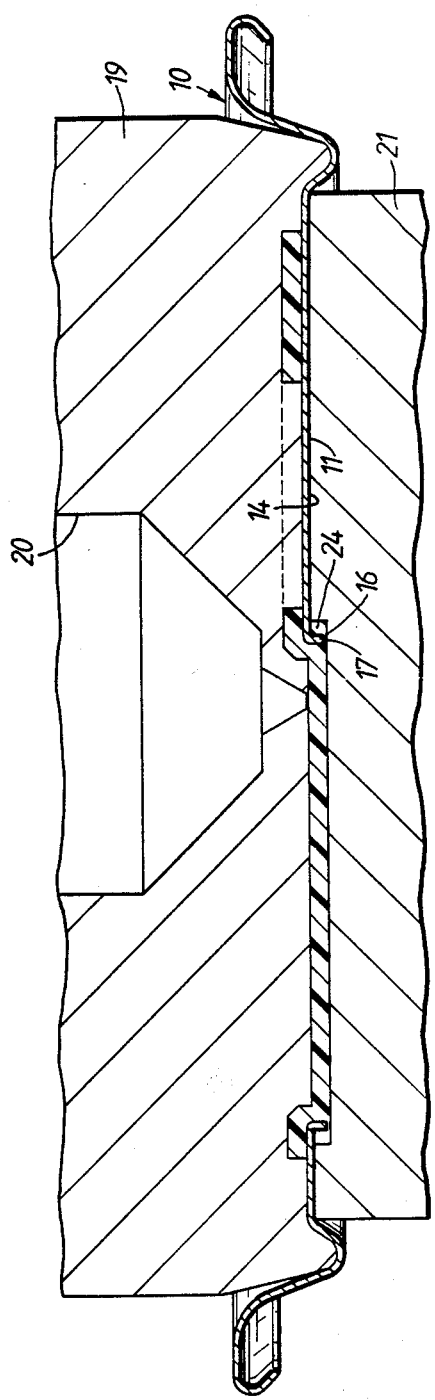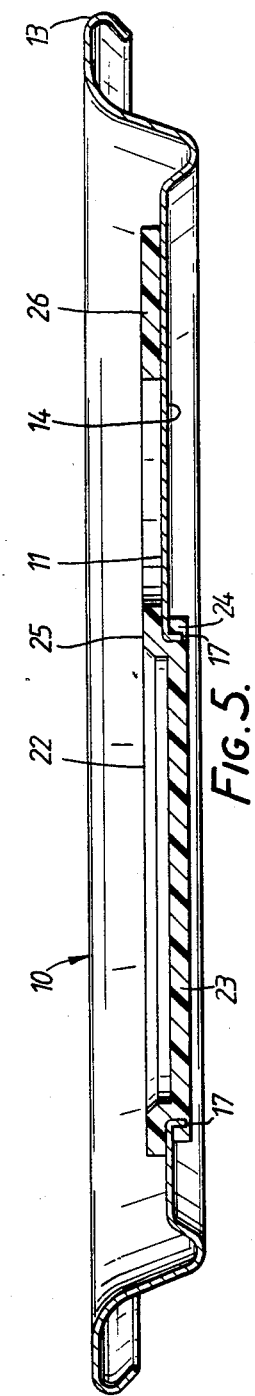
FIG. 4.
FIG. 5.

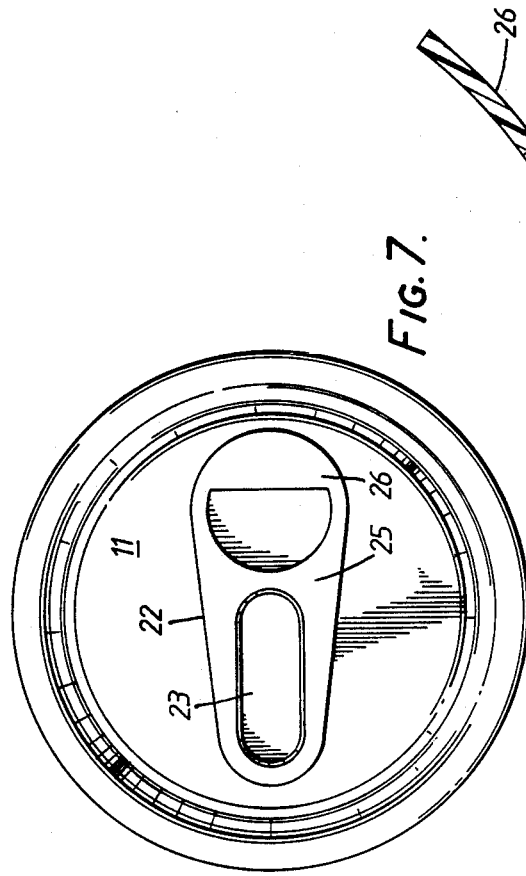
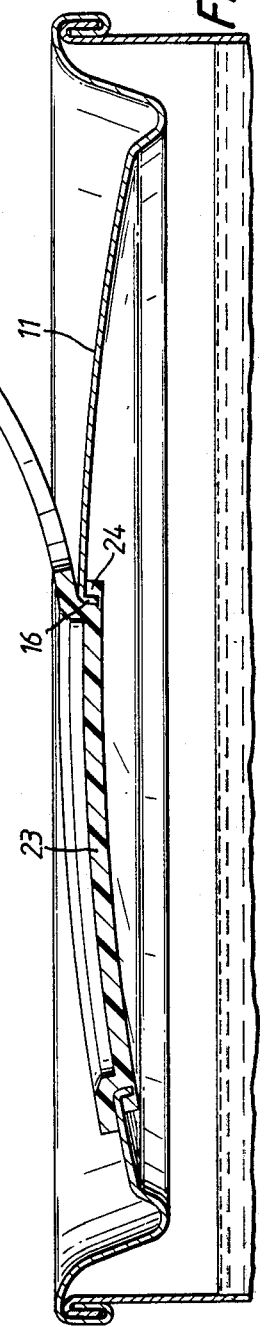

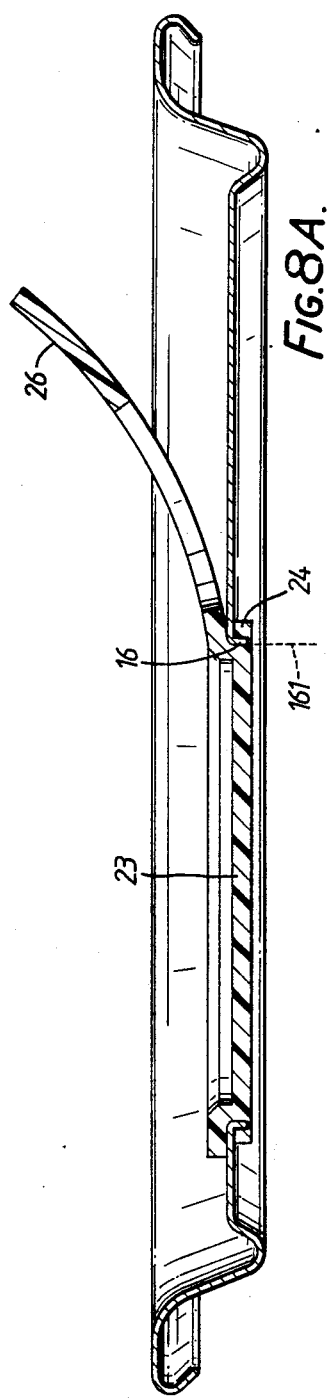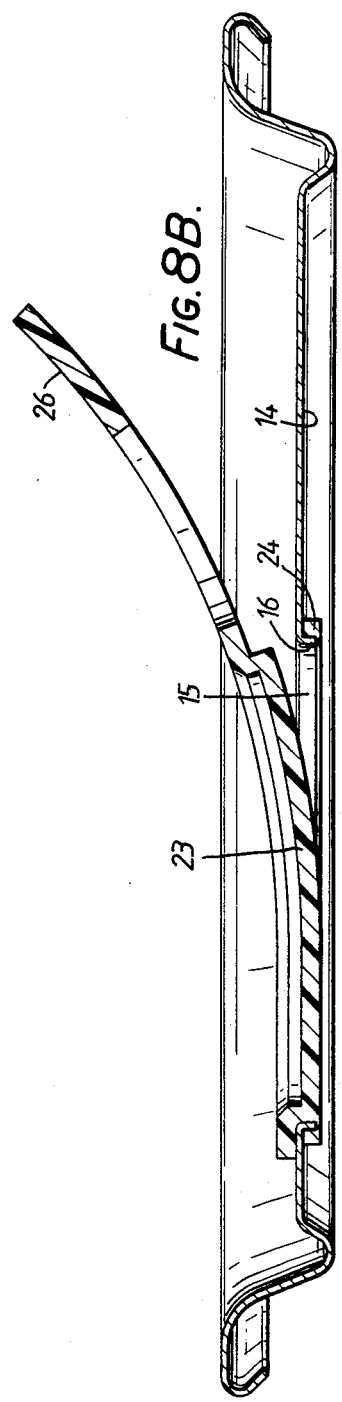

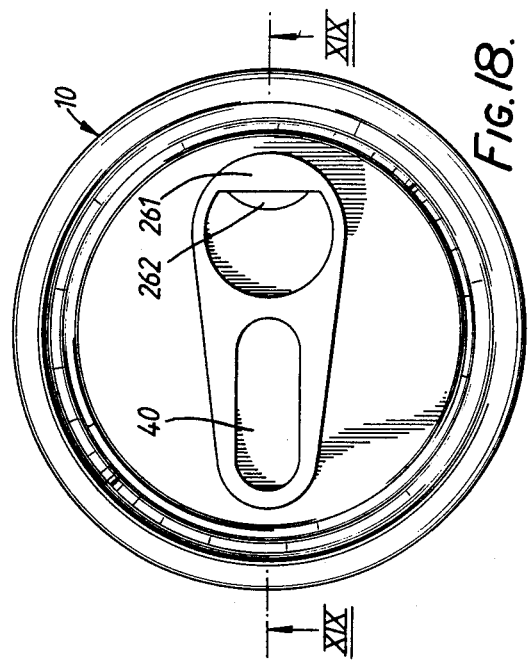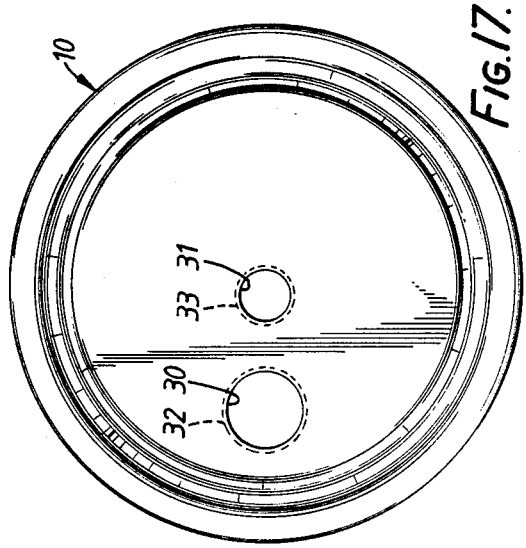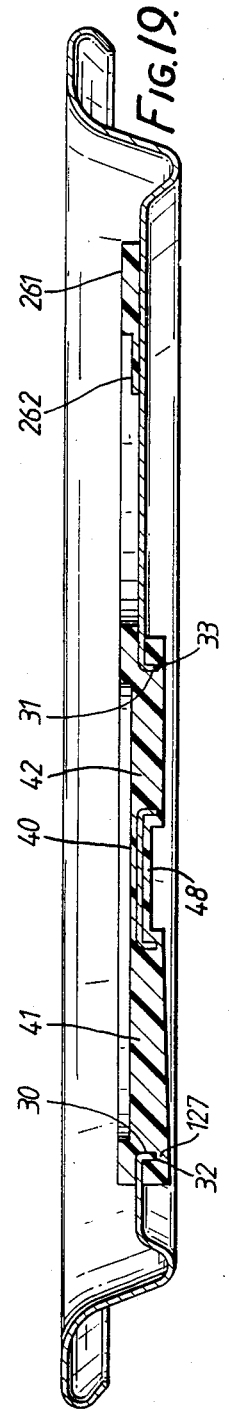

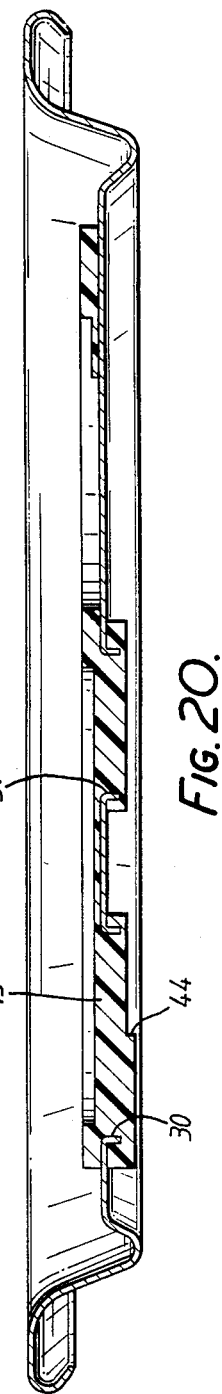

METHODS OF MAKING METAL CAN ENDS WITH PLASTICS CLOSURES

CROSS-REFERENCE TO RELATED APPLICATIONS

This application is a continuation-in-part of application Ser. No. 07/163,186 filed on Feb. 25, 1988 entitled Methods of Making Metal Can Ends with Plastics Closures, and now Pat. No. 4,813,837; which is a Rule 62 Continuation of 06/906,887 filed on Sept. 15, 1986 entitled Methods of Making Metal Can Ends with Plastics Closures, and now abandoned.

BACKGROUND OF THE INVENTION

1. Field of the Invention

This invention relates to methods of making can ends with plastics closures, particularly tear-open plastics closures of the kind incorporating a ring pull, for cans intended to be resistant to leakage when subject to internal pressures, such as arise from carbonation of a beverage contained in the can and/or from thermal processing of the can contents. Examples of such thermal processes include heating cold-filled carbonated beverage-containing cans to 35° C. to drive off condensation before shrink-wrapping packages of such cans, pasteurizing beverage-containing cans at 65° C., and sterilizing food-containing cans at 121° C. The closures must accordingly be capable of withstanding considerable internal pressure in the container, sufficient to cause distortion of the can end into a domed shape.

The plastics material used must, therefore, be resistant to softening or creep at the temperatures envisaged for the thermal processing. The closures must also be resistant to distortion due to creep when the filled cans are stored under internal pressure, at temperatures up to 35° C. Furthermore, in order to enable the can ends to be made rapidly and economically, it is important that the plastics closure should be made in a single piece and attached to the can end in the same operation. Finally, it is essential that the closures should be designed so that they can be torn open manually without difficulty, even though the aperture used for pouring out a beverage needs to be of relatively large size.

2. Description of the Prior Art

Our British Pat. Specification No. 1,393,875 describes metal containers having at least one orifice in a container wall closed by a unitary closure of resilient plastics material, such as nylon or polypropylene, comprising a pull tab integral with a plug portion which projects transversely to the plane of the pull tab, the plug portion extending through a said orifice and having a free end upset behind said wall to define a rivet head having a radial flange sealingly bonded to said wall around the orifice, e.g. by being bonded to an internal coating on the wall by means of heat and pressure applied during the upsetting operation. Examples described in Specification No. 1,393,875 are made of polypropylene and are fitted into relatively small orifices having a downturned flange around the periphery, so that on removal of the plug portion it is severed from the portion of the plastics material outside the downturned flange by the force exerted on the pull tab. The disadvantage of the containers of Specification No. 1,393,875 which renders them impractical in economic terms is that the plastics closure is necessarily moulded in a separate operation from that in which it is secured to the container wall by the upsetting of the free end of the plug portion. Furthermore, no guidance is given as to how to combine resistance to distortion or creep with easy manual opening of the relatively large apertures which are required for beverage-containing cans.

In our UK Pat. specification No. 2,073,646B, we have described a method and apparatus for forming a plastics moulding on a metal substrate, in particular a plastics closure for a can, in which plastics material is injected into a cavity defined by the apertured metal substrate (e.g. a can end) and a die or dies to form a plug closure filling the aperture, and the metal substrate is locally heated adjacent the plastics material by means of energy from an induction coil to bond the plastics moulding to the metal substrate. Although it is stated that a coating material to which the plastics material will adhere may be applied to the metal wall before the plastics material is moulded therein, it is indicated that the induction heating is necessary to prevent the plastics material chilling before a seal can be effected between the plastics material and either the metal or the coating material thereon. In this way, the closure is formed and located in the can end in a single operation, but the provision of induction heating involves complication and expense. An example illustrated has a flange formed in the metal around the aperture which is curled through more than 180° and the polyethylene material of the closure is formed with a circular groove in its underside as a weakening line to enable the plug closure to be manually torn away. Unfortunately, the tougher plastics which will resist thermal processing, such as nylon and polypropylene, will not tear along such weakening lines because tensile forces orientate the polymer chains to produce a strength which can not be overcome manually.

SUMMARY OF THE INVENTION

We have not unexpectedly found that, with an appropriate internal coating on the can end and an appropriate formation of the aperture and downturned flange, it is possible to injection mould a tear-open plastics closure into the can end using a thermally resistant plastics material without additional heating of the metal, i.e. without additional heating (such as induction heating) over and above the heating effect on the metal produced by the molten plastics material employed in the injection moulding process, thereby to produce a closure which will resist distortion due to creep when the can end is distorted into a domed shape by internal pressure in the can, but which can be torn open manually when required.

According to the invention, a method of making a metal can end with a central panel and a tear-open plastics closure in said panel, for a can intended to resist leakage when subject to internal pressures, comprises the steps of:

(a) providing the undersurface of the metal can end with a coating of plastics material, (b) piercing the central panel of the metal can end to form an aperture surrounded by a downturned flange extending around the periphery of the aperture and extending away from the central panel at an angle of between 70° and 110° to the plane of the central panel and having a substantially flat end surface, and (c) injection moulding onto the can end, without additional heating of the metal, a one-piece ring pull closure of a plastics material which is resistant to softening at temperatures up to at least 65° C, in such a manner that the plastics material of the closure fills the aperture and surrounds it on both surfaces of the can end and bonds with the plastics material of the coating, the thickness of the plastics material of the closure being chosen so as to enclose the downturned flange totally, with a residual thickness below the flat end surface of the flange in the range from 0.125 to 0.5 mm, so as to enable the closure to resist distortion of the closure resulting from creep at temperatures up to at least 35° C., but to be capable of being sheared against the flat end surface of the flange when the ring pull is pulled manually.

In this way, the can ends can be produced rapidly and economically and with a minimum risk of leakage from the closure in the completed can. The bonding of the plastics material of the closure to the plastics material of the coating produces a surprisingly effective and leak-proof seal in spite of the absence of additional heating, while the formation of the flange with its flat end surface extending substantially laterally ensures that any burrs formed in the piercing operation will also extend laterally and not through the residual thickness of the plastics material below the flange. The only critical dimension is the residual thickness of the plastics material below the end surface of the flange, which must be in the specified range of 0.125 to 0.5 mm in order to ensure that the closure remains leak-tight but is easy to open manually by shearing against the flange. A shearing action is essential, because the plastics material, if subjected to tensile forces, will become oriented and too strong to be torn manually. The residual thickness is determined by the thickness of the plastics material (set by the mould cavity dimensions) and the extent to which the flange is downturned in the piercing operation, which is itself fixed by the geometry of the press tool used, so the residual thickness can be controlled within close limits during production. The flange stiffens the central panel to compensate for the weakness introduced by the relatively large pouring aperture and avoids bending of the metal around the aperture, which would result in tensile, rather than shearing, forces being applied to the plastics material of the closure on pulling the ring pull. The hot mouldings can be removed from the mould without distortion because they can be handled indirectly via the metal component of the can end and they can complete their cooling outside the mould. This feature, in combination with the absence of a step of additionally heating the metal can end, makes it possible to achieve rapid and economical production, for example with a reduction of the moulding cycle time from typically 10 seconds to around 2 seconds.

Where the closure is moulded from a plastics material with a particularly high creep resistance, such as a nylon, or the conditions of use of the can are not arduous, it has been found effective to form the can end with a single relatively large aperture, e.g. an aperture having two straight parallel sides and semi-circular ends, and to provide an equal residual thickness of the plastics material of the closure below the flat end surface of the flange all around the periphery of the aperture.

Polypropylenes are generally less expensive than nylons, but have less creep resistance, though this property can be improved by incorporation of appropriate fillers such as talc.

When a plastics material with lower creep resistance than nylon is used and the can is subjected to arduous conditions, it has been found that distortion of the above-described single aperture closure and consequent leakage can occur as a result of creep of the plastics material at one end of the aperture. To reduce the risk of such distortion and leakage, a method may be adopted in which the can end is pierced to form a single pear-shaped aperture having ends of differing radii and the moulding is effected in such a manner that the residual thickness of the plastics material of the closure below the flat end surface of the flange is varied around the periphery of the aperture, being greatest in the part around the end of the aperture having the larger radius. The greater residual thickness of the plastics material beneath the flange around he larger radius end of the aperture effectively reduces the risk of the plastics material pulling away from the flange due to creep, while not affecting the capability of the closure of being sheared against the flange for opening at the smaller radius end.

Alternatively, the can end may be pierced to form a pouring aperture and a smaller vent aperture and the moulding effected in such a manner that the residual thickness of the plastics material of the closure below the flat end surface of the flange around the periphery of the pouring aperture is varied, being greatest in the part of the periphery remote from the vent aperture.

This method provides even greater assurance against distortion and leakage due to creep, because it results in production of a part of the closure joining the parts which fill the two apertures and lying against the outer surface of the can end, which can act as a strap to hold the parts of the closure in position when the can end is distorted into a domed shape under internal pressure. Opening of the closure may be initiated by opening of the vent aperture, which may be quite small, in which case it need not be provided with a downturned flange around its periphery because it does not then substantially affect the stiffness of the central panel.

In either of the forms of the invention described in the three preceding paragraphs, the closure may be moulded of polypropylene and the residual thickness may be varied either in a continuous manner or in a stepwise manner.

The plastics material of the coating on the under surface of the can end is preferably of a similar polymer to that of the closure, in order to facilitate good bonding.

Where the metal can end is formed with an outwardly flared raised edge with a curled periphery for seaming to a can side wall, the plastics closure is preferably injection-moulded onto the can end so as to have a total thickness of plastics material no greater than the depth of the peripheral curl on the can end so as not to impede stacking of nested can ends.

Preferably the plastics material of the closure is injection-moulded so as to have a residual thickness below the flat end surface of the flange in the range from 0.20 mm to 0.40 mm.

Preferably the flange is downturned to extend for a distance H of 0.50 mm to 1.25 mm below the plane of the can end (FIG. 6F), the most preferred dimension being substantially 0.75 mm.

Preferably the plastics material of the closure is injection-moulded so as to extend laterally from the flange on the undersurface of the can end for 0.25 mm to 2.50 mm, the most preferred dimension being substantially 1.25 mm.

Preferably the plastics material of the closure is injection-moulded so that the ring pull lies against the upper surface of the can end and has a thickness of 0.50 mm to 1.50 mm, the most preferred thickness being substantially 1.0 mm.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a cross-sectional view of a metal can end;

FIG. 2 is a similar view of the can end after it has been pierced and flanged;

FIG. 3 is a plan view of the can end of FIG. 2,

FIG. 4 is a diagrammatic cross-sectional view illustrating the injection-moulding of a closure onto the can end of FIGS. 2 and 3;

FIG. 5 is a cross-sectional view of the can end with the plastics closure moulded thereon;

FIG. 7 is a plan view of the can end of FIG. 5;

FIGS. 8A and 8B are cross-sectional view similar to FIG. showing the opening of the closure;

FIG. 9 is a view similar to FIG. 8A but illustrating the effect of internal pressure on the can end;

FIG. 17 is a plan view similar to FIGS. 3, 10 and 14 of a further alternative form of can end;

FIG. 18 is a plan view of the can end of FIG. 17 with a plastics closure moulded thereon;

FIG. 19 is a cross-sectional view on line XIX—XIX of FIG. 18;

FIG. 20 is a similar cross-sectional view of a modification;

DETAILED DESCRIPTION OF THE INVENTION

Figure 6A:
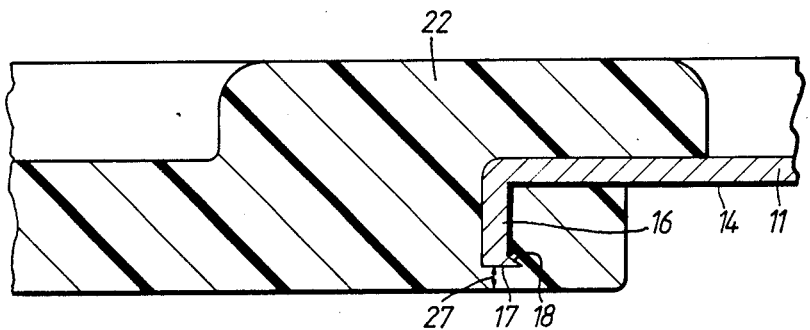
FIGS. 6A, 6B and 6C are detailed cross-sectional views to a larger scale illustrating alternative forms of the downturned flange around the periphery of the aperture.

In the embodiments of the invention now to be described, one starts with a standard type of can end 10, as illustrated in FIG. 1, which comprises a flat panel portion 11 with an outwardly flared raised edge portion 12 and a curved periphery 13 for seaming to a can side wall (not shown). The undersurface of the panel portion 11 is provided with a coating 14 of a plastics material. As shown in FIGS. 2 and 3, the panel portion 11 is pierced so as to form an aperture 15 with a downturned flange 16 around its periphery. The flange 16 extends at an angle of between 70° and 110° to the plane of the panel 11, and preferably 90° to it as shown. The flange 16 has a substantially flat end 17 which thus extends approximately parallel to the plane of the panel 11. Any burrs 18 (FIGS. 6A, 6B and 6C) produced in the piercing operation will also extend laterally, as described below.

FIG. 4 illustrates diagrammatically the step of injection-moulding the closure onto the can end. The pierced and flanged can end 10 of FIGS. 2 and 3 is placed between a steel top mould 19 having an injection passage 20 and steel bottom mould 21. Molten plastics material is injected through the passage 20 to form the closure 22 shown more clearly in FIGS. 5 and 6. It is an important and surprising feature of the present invention that no additional heating of the can end 10 is necessary, over and above the heating effect produced in the apparatus by the molten plastics material, before injection of the plastics material. As can be seen in FIG. 4, the plastics material fills the aperture 15 and surrounds it on both surfaces of the can end 10. Furthermore, the plastics material bonds with the plastics material of the coating 14 on the underside of the can end so as to secure the closure in a leak-proof manner.

Figure 6B:
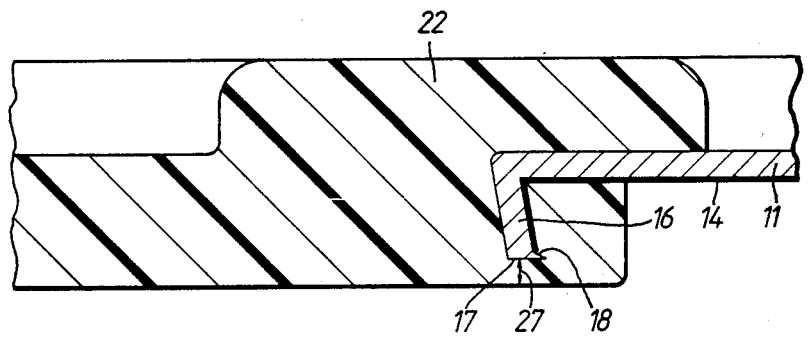
Figure 6C:
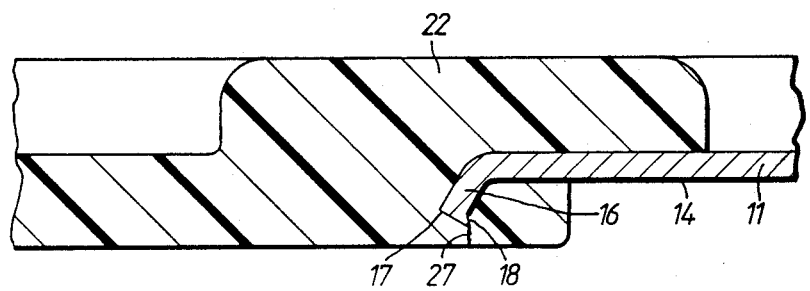

FIGS. 6A 6B and 6C illustrate how the piercing operation produces burrs 18 on the inside edge of the flange 16. FIG. 6A shows the flange 16 formed so as to extend at 90° to the plane of the panel 11, as is preferred, but it may extend at an angle A of 110°, as shown in FIG. 6B, or an angle B of 70°, as shown in FIG. 6C, or at any angle between 70° and 110°. It can be seen that the burrs 18 then extend substantially laterally and do not penetrate the residual thickness 27 of the plastics material.

Figure 6D:
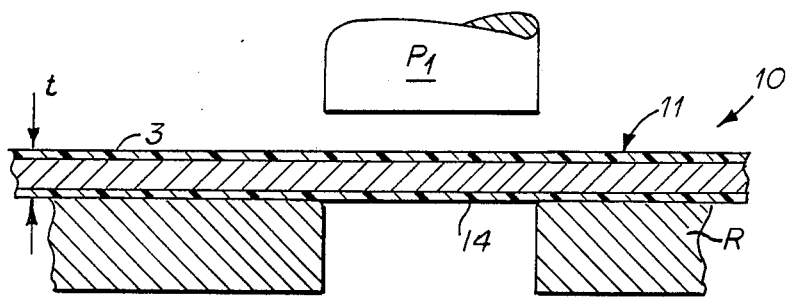
FIGS. 6D, 6E and 6F are detailed cross-sectional views of tooling including piercing and forming dies to form the down-turned flange of FIG. 6A.
Figure 6E:
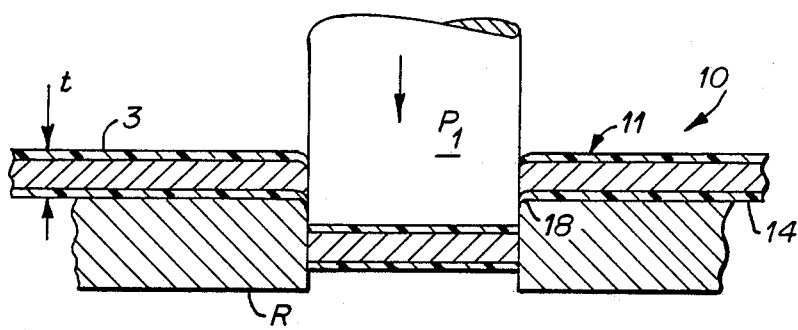
Figure 6F:
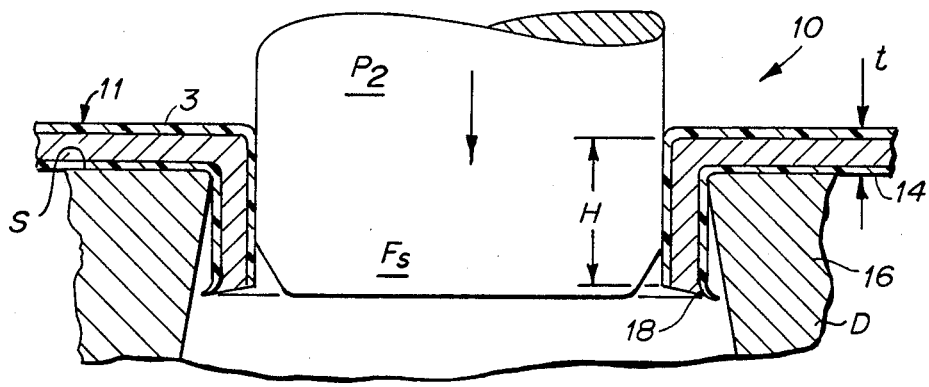

Reference is made to FIGS. 6D, 6E and 6F which illustrate conventional tooling for forming the can end 10 of FIGS. 2 and 3 with the flange 16 of FIGS. 6A.

The can end 10 of FIG. 1 is preferably constructed from steel, tin plate, chrome/chrome oxide coated steels (sometimes called TFS), electro-chrome coated steel (sometimes called ECCS), aluminum and aluminum alloys. Can end 10 and particularly the flat panel portion 11 (FIG. 6D) thereof has a thickness (t) in the range of 0.15 mm (0.006") to 0.4 mm (0.016") with the thicker end of the latter range being used for larger diameter can ends or when weaker metals are used.

The interior of the can end 10 has the coating 14 thereupon which must necessarily be fusable to the plastics plug or closure (22 of FIG. 5, for example) heretofore described during moulding. Accordingly, the coating 14 is preferably a polypropylene coating when the material of the closure or plug 22 and/or the plug portion 24 is also polypropylene material. A maleic anhydride modified polypropylene coating will fuse to either a polypropylene or a nylon plug 22, as required.

The flat panel portion 11 is also shown in FIG. 6D being provided with an optional external coating but any such external coating 3 must not adhere to the pull ring (26, for example, of FIG. 5), otherwise one cannot lift the pull ring to remove the plug portion 24 and create the opening (unnumbered) defined by the aperture 15. However, metals have abrasive surfaces, such as TFS, are usually coated to protect press tools from abrasive wear, and suitable materials for the coating include epoxy-based resins, such as an epoxy ester.

As was earlier described with respect to FIGS. 6A, 6B and 6C, in accordance with this invention the burr 18 is created during the piercing operation to form the aperture 15 (FIG. 2) prior to thereafter forming the flange Furthermore, in accordance with this invention, the burr (or burrs) 18 must be directed laterally of the flange 16 (FIGS. 6A, 6B and 6C), and experiments have now confirmed that this is best achieved by utilizing a suitably profiled metallic punch P1 (FIG. 6D) which penetrates first the outside coating 3, then the exterior surface (unnumbered) of the panel portion 11, cutting through the latter, and continuing to emerge through the interior surface coating 14 which rests upon a conventional cutting ring R. The cutting stroke of the punch P1 is diagrammatically illustrated between the positions illustrated in FIGS. 6D and 6E, and in the latter it will be noted that the burr 18 is directed generally perpendicular to the plane of the panel portion 11 and the coatings After the punch P as been retracted in a conventional manner, the can end 10 is transferred to punch tooling which includes a suitably profiled metallic forming punch P2 having a frusto-conical forming surface Fs which conventionally cooperates with a female die D. Prior to the forming punch P2 descending to the position shown in FIG. 6F, the can end 10 is concentrically positioned upon the female die D with the coating 14 contacting an upper support surface S of the female die D and with the burr 18 projecting downwardly in generally parallel relationship to both the forming punch axis and its direction of travel. The punch P2 descends to the position generally shown in FIG. 6F at which time a portion of the flat panel portion 11 is formed into the substantially upright flange 16 which also redirects the burr 18 outwardly. The frusto-conical surface Fs of the punch P2 leaves the exterior surface/coating 3 quickly on the return stroke without scuffing any exterior coating as a result of material spring-back gripping the punch P2 and still provides a flange 16 (FIG. 6F) which is strong enough to shear the residual thickness of plastics 27 (FIGS. 6A, 6B and 6C).

It should be noted that if the end panel 11 were positioned upon the ring R of FIG. 6D with the interior coating 14 opposing the punch P1 and the exterior coating 3 resting upon the ring R, the burr formed during the eventual forming operation of FIG. 6F would project radially inwardly, not radially outwardly as does the burr 18 in FIG. 6F. Thus, the burr 18 in this hypothetically reverse situation would be essentially buried in the plastics of the inner flange of the plug 22, but when the plug is sheared open, the burr might well be uncovered to, thus, become a hazard to the tongue of an imbiber/user. This burr might not be a hazard to the tongue if the flange and punch P2 wipes it flat, but such a punch could wipe the burr to an axial position in which the burr could well penetrate the residual thickness 27 (FIGS. 6A, 6B and 6C), thereby interferring with the flow of plastics during the moulding operation heretofore described and possibly constituting a sight for corrosion in the finished can end 10 or a leak path through the plastic.

The height H of the flange 16 (FIG. 6F) is preferably in the range of 2t to 5t where "t" is, as heretofore noted, the thickness of the tin plate or panel portion 11. In the latter range the flange 16 will function much as a web of angle iron which will resist buckling under shearing forces that it must resist during shearing of the thickness of the residual plastics.

A preferred combination of the various components, dimensions and thicknesses heretofore noted in general would include a can end 10 stamped from TFS 0.010" (0.25 mm) thick (t) coated with an internal coating 14 of polypropylene and formed to have a downturned flange 16 of a height (H) of 0.030" (0.75 mm). The exterior coating, as provided in FIGS. 6D, 6E, 6F, is an epoxy based coating.

Because of the unique process of manufacture of the can end 10 in the manner described with respect to FIGS. 6D, 6E, 6F, each can end 10 includes the following characteristic synergistic features and functions:

(a) a pierced and flanged coated metal can end in which the burr (or burrs) are so disposed as to assure safety during storage and when opened, through an associated plastics plug;

(b) at least an interior plastics coating which matches the plastics injection-moulded plug which creates cross-fusion between the two during the plastics plug/insert/plug portion moulding process;

(c) a residual plastic portion of a thickness and location adjacent the burr which can be manually sheared by the burr which is in turn resisted by the strength of the flange as determined by the height H to thickness ("t") ratios heretofore noted; and (d) the existence of a lesser residual plastics thickness at the opening and any greater residual plastics thickness at the diametrically opposite end thereto in order to resist creep.

The form of the closure 22 is illustrated in more detail in FIGS. 5 and 7. It will be seen that the closure comprises a plug portion 23 filling the aperture 15 and, on the underside of the can end 10, a surrounding portion 24 outside the flange 16. The thickness of the plastics material is such as to enclose the flange 16 totally but to be capable of shearing against the flat end surface 17 of the flange when the closure is removed as described below. The residual thickness 27 (FIGS. 6A, 6B and 6C) of the plastics material below the end surface 17 of the flange is in the range from 0.125 to 0.5 mm, preferably from 0.20 to 0.4 mm. The upper surface of the plug portion 23 is recessed below the level of the surrounding portion 25 which extends laterally to form a ring pull 26.

The total thickness of the plastics material is also chosen so as to be no greater than the depth of the peripheral curl 13 so that when a number of the can ends are stacked one upon another the plastics material will not impede the stacking or prevent the can ends from nesting one inside another.

In order to remove the closure, as shown in FIGS. 8A and 8B, the ring pull 26 is lifted to pull the plug portion 23 upwards, whereupon it shears away from the surrounding portion 24 against the flange 16 along line 161 (FIG. 8A) adjacent to the ring pull 26. Shearing continues down the sides of the aperture 15 until the plug portion 23 can be completely removed from the can end.

When the can is subjected to internal pressure, e.g. when it is used to contain a carbonated beverage, the panel 11 assumes a convex shape as illustrated in FIG. 9. This causes tension in the closure, tending to pull the portion 24 away from the flange 16 but does not affect the seal of the closure in the can end, provided that the plastics material is sufficiently resistant to creep and consequent distortion of the closure. Nylon is a suitably creep-resistant material.

FIGS. 10 to 13 illustrate a modified embodiment in which a can end 10 is pierced with two circular apertures, namely, a pouring aperture 30 and a smaller vent aperture each surrounded by a downturned flange 32, 33, respectively, extending at 90° to the plane of the panel portion 11 and having a flat end surface 34.

Figure 11:
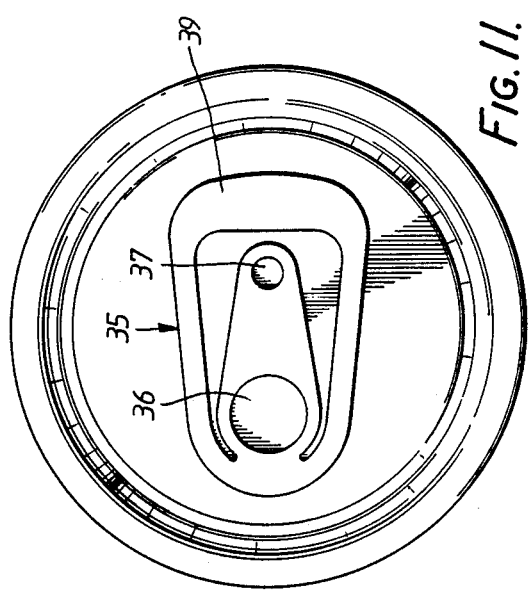
FIG. 11 is a plan view of the can end of FIG. 10 with a plastics closure moulded thereon.
Figure 10:
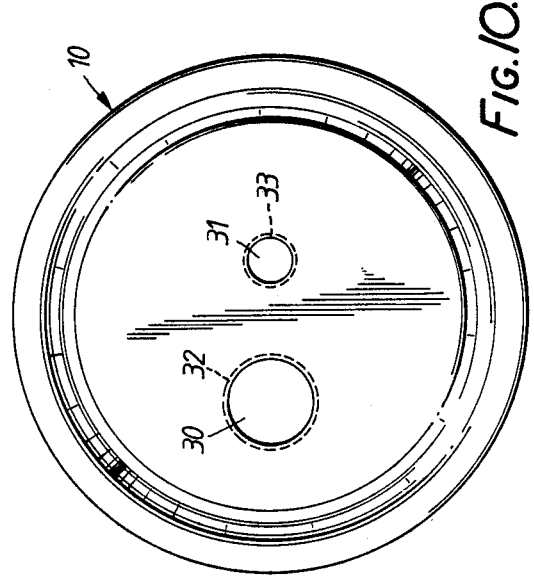
FIG. 10 is a plan view similar to FIG. 3 of an alternative form of can end with two apertures pierced therein.
Figure 12:
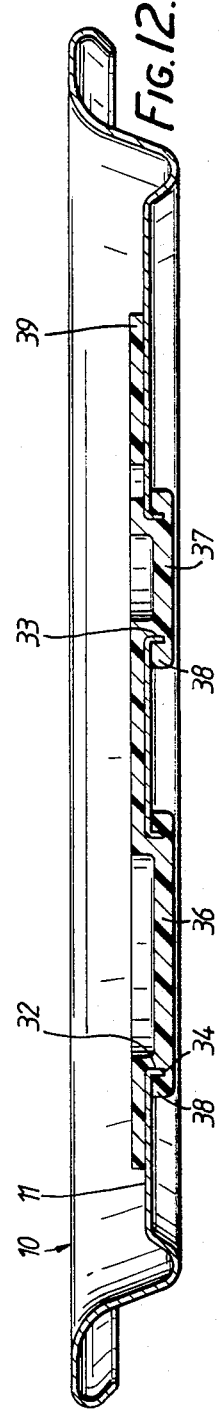
FIG. 12 is a cross-sectional view of the closure of FIG. 11.
Figure 13:
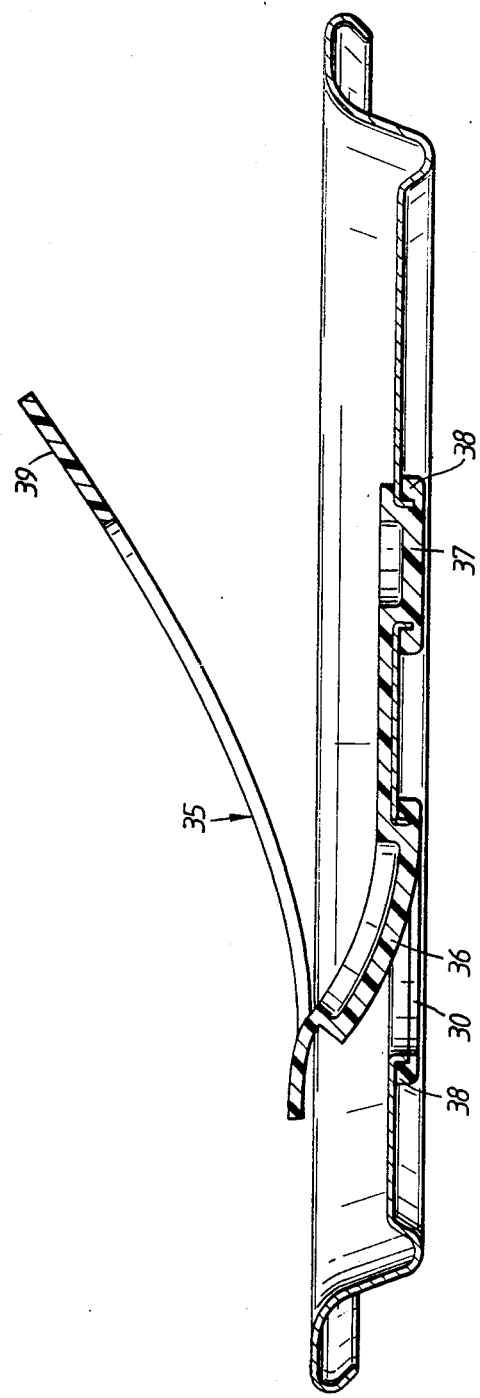
FIG. 13 is a cross-sectional view similar to FIG. 12 showing of the closure of FIGS. 10 to 12.

The plastics closure 35 is injection-moulded as described above with reference to FIG. 4 so as to have two plug portions 36, 37 fitting respectively into the apertures 30, 31 and surrounded on the underside of the can end 10 by surrounding portions 38. The plastics material encloses each flange 32, 33 totally, with a residual thickness below the flat end surface 34 in the range from 0.125 to 0.5 mm, preferably from 0.2 to 0.40 mm. The closure 35 also incorporates a ring pull 39 which in this case lies on the right hand side of the plug portions (as seen in FIGS. 11, 12 and 13) but is connected to them at the left-hand end, i.e., close to the pouring aperture plug 36. The opening procedure accordingly starts at the left-hand side, as shown in FIG. 13, with shearing of the plug 36 from its surrounding portion 38 to open the pouring aperture 30, followed by shearing of the plug 37 from its surrounding portion 38 to open the vent aperture 31. The use of two apertures enables one to use apertures of smaller area and smaller radii of curvature than in the embodiment of FIGS. 2 to 9, and thereby reduces the tendency to distort as a result of creep under tension when subject to internal pressure in the can, so that a material with a slightly lower creep resistance than nylon can be used, such as polypropylene.

Figure 15:
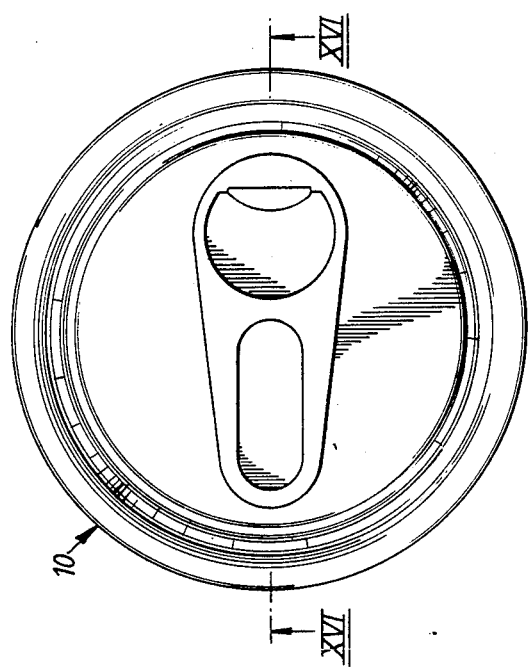
FIG. 15 is a plan view of the can end of FIG. 14 with a plastics closure moulded thereon.
Figure 14:
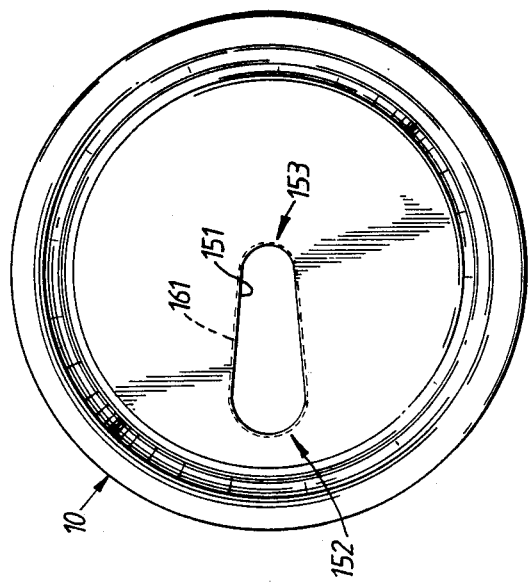
FIG. 14 is a plan view similar to FIGS. 3 and 10 of another alternative form of can end.
Figure 16:
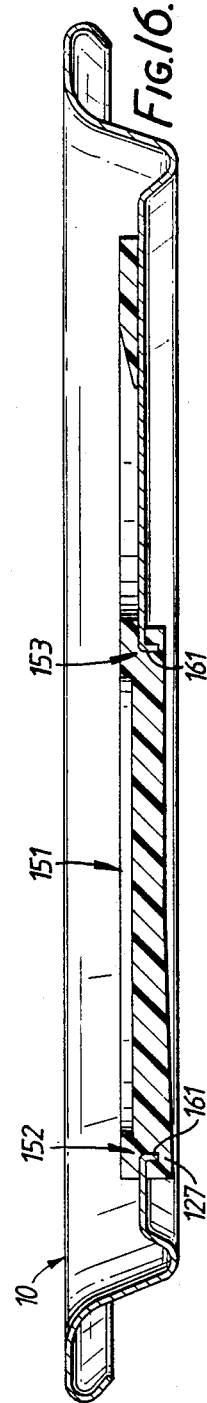
FIG. 16 is a cross-sectional view on the line XVI—XVI of FIG. 15.

A modified form of single-aperture can end is illustrated in FIGS. 14 to 16. This form differs from that described above with reference to FIGS. 2 to 9 in that it has a pear-shaped aperture 151, having a pouring end 152 of larger radius than the opposite or venting end 153, and a downturned flange 161 around its periphery. The residual thickness 127 of the plastics material of the closure below the flat end of the flange 161 is varied around the periphery of the aperture, while remaining within the range of 0.125 to 0.5 mm. As can be seen in FIG. 16, the residual thickness 127 is varied in a continuous manner around the left-hand half of the aperture 151, being greatest at the pouring end 152 which has the greater radius of curvature and where the tendency to distort is greatest under tension resulting from internal pressure in the can. The increased residual thickness 127 at the pouring end 152 improves the resistance to creep and distortion of the closure, so that a material with a lesser creep resistance than nylon may be used, such as polypropylene. In a specific example, the residual thickness 127 may vary from 0.4 mm at the pouring end 152 to 0.2 mm in the right-hand half of the aperture 151. If desired, an intermediate portion may have a constant residual thickness of 0.3 mm along the straight convergent sides of the aperture. The transition from the thicker to thinner portion may be gradual, as shown in FIG. 16, or may be by way of a step in the lower surface of the plastics material.

FIGS. 17 to 19 illustrate a further embodiment with two apertures, namely, a pouring aperture 30 and vent aperture 31 with respective downturned flanges 32, 33, as in FIGS. 10 to 13. The pull ring 261 is similar to that of FIGS. 7 to 9, so as to ensure that the vent aperture 31 is opened first, but is provided with an additional thin lip 262 to facilitate engagement by a finger. The residual thickness 127 of the plastics material below the flat end of the flange 32 is continuously varied around the periphery of the pouring aperture 30, as can be seen in FIG. 19, while remaining within the range 0.125 to 0.5 mm being greatest in the part of the periphery remote from the vent aperture 31, so as to provide improved resistance to creep where the tendency to distort is greatest. It is not necessary to vary the residual thickness around the vent aperture 31. The portions of plastics material enclosing the flanges 32, 33 are joined on the underside of the can end by a straight feeder portion 48 to facilitate flow of plastics material during the moulding operation.

A further feature of this embodiment is that a portion 40 of the closure joining plug portions 41, 42 filling the two apertures 30, 31 acts as a strap to hold the parts of the closure in position when the can end is distorted under internal pressure.

As mentioned above, the residual thickness of the plastics material below the downturned flange may be varied in a stepwise, rather than a continuous manner. This is illustrated in FIG. 20, which represents a modification of the embodiment of FIGS. 17 to 19 and shows a plug portion 43 in the pouring aperture 30 formed with a transverse step 44 so as to result in a stepwise increase in the residual thickness at the left-hand side of the pouring aperture 30, remote from the vent aperture 31.

Figure 21:
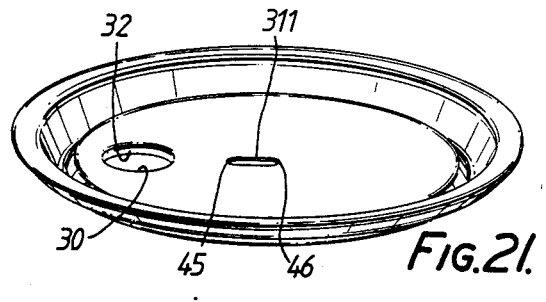
FIG. 21 is a perspective view of a modified form of the can end of FIG. 17.
Figure 22:
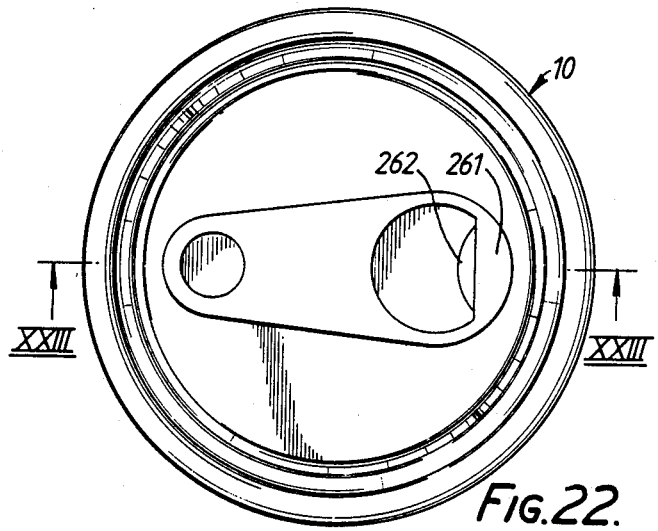
FIG. 22 is a plan view of the can end of FIG. 21 with a plastics closure moulded thereon.
Figure 23:
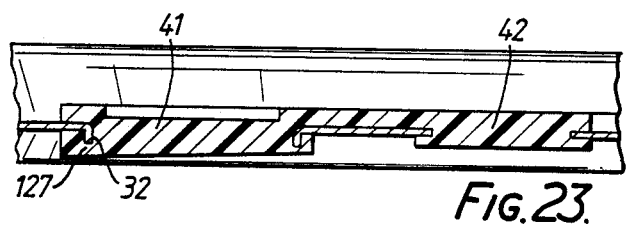
FIG. 23 is section on the line XXIII—XXIII of FIG. 22.

As mentioned above, if the vent aperture is small enough it does not need to be provided with a downturned flange. FIGS. 21 to 23 illustrate a modification of the embodiment of FIGS. 17 to 19 in which the vent aperture 311 is of substantially smaller dimensions than the vent aperture 31 of FIGS. 17 to 19, having straight sides joined by curved ends 45, 46 of small radius of curvature. No flange is provided around the vent aperture 311. On pulling on the pull tab 261, the closure shears easily against the end 46 of the vent aperture because the stiffness of the can end remains sufficient to prevent it from bending, due to the small area and sharp curvature of the vent aperture. The residual thickness 127 below the flange 32 around the pouring aperture 30 is varied as in the embodiment of FIGS. 17 to 19. The closure again shears easily at the right-hand side of the pouring aperture 30 due to the small residual thickness at this point, while the increased residual thickness at the side remote from the vent aperture provides the necessary resistance to creep.

Figure 24:
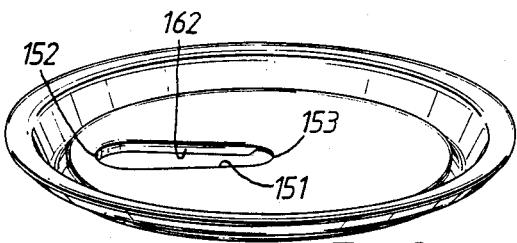
FIG. 24 is a perspective view of a modified form of the can end of FIG. 14.
Figure 25:
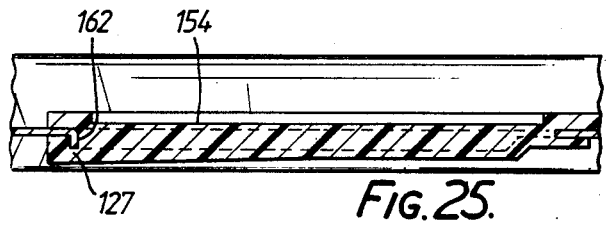
FIG. 25 is a part-section through the can end of FIG. 24 with a closure moulded thereon.

FIGS. 24 and 25 illustrate a modification of the embodiment of FIGS. 14 to 16, in which the pear-shaped aperture 151 has a flange 162 which extends around the broader end 152 but is discontinued at the narrow end 153 of the aperture, where the need for resistance to creep is minimal. The plug portion 154 of the closure can be seen from FIG. 25 to provide an increased residual thickness at the broader end 152 of the aperture, as in FIGS. 14 to 16.

Figure 26:
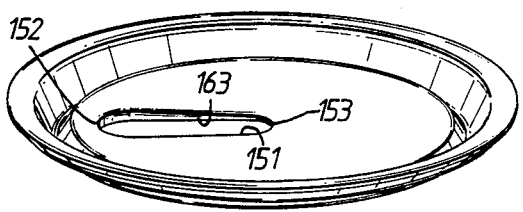
FIG. 26 is a perspective view of another modified form of the can end of FIG. 14.
Figure 27:
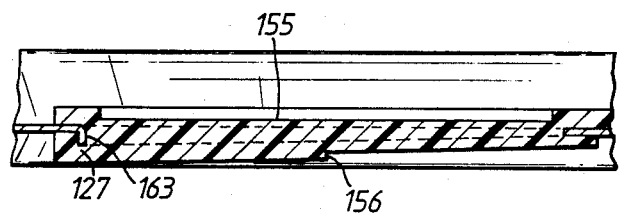
FIG. 27 is a part-section through the can end of FIG. 26 with a closure moulded thereon.

FIGS. 26 and 27 illustrate a further modification of the embodiment of FIGS. 14 to 16, in which the pear-shaped aperture 151 has a flange 163 which varies continuously in depth from a maximum at the broader end 152 to zero at the narrow end 153 of the aperture. The plug portion 155 in this case is thickened in a stepwise fashion at 156 but otherwise varies in thickness in proportion with the depth of the flange 163, so that the residual thickness below the flange is greater around the broader end 152 but is constant around the narrow end 153 of the aperture. The greater depth of the flange 163 at the broader end 152 of the aperture assists the increased residual thickness to provide the necessary resistance to creep.

The can ends illustrated and described are intended for use on cans for beverages which require thermal processing, i.e., heating to 35° C. to drive off condensation before shrink-wrapping and/or pasteurization at 65° C., so it is necessary that the plastics material used for the closure should be resistant to softening at temperatures up to 65° C. The plastics material used for the coating 14 on the underside of the can end is preferably a similar polymer in order to ensure adequate bonding.

It is essential that the thickness of the plastics material of the closure is such as to enclose the flange 16 totally but to be capable of shearing against the flat end surface 17 of the flange when the ring pull is pulled to open the closure. To achieve this, we have found the optimum dimension for the downturn of the flange to be 0.75 mm, though it may vary from 0.50 mm to 1.25 mm. The lateral extent of the surrounding portions 24 and 38 is also important. The preferred lateral extent from the flange of these portions is 1.25 mm though it may vary from 0.25 mm to 2.5 mm.

The residual thickness 27, 127 of the plastics material of the closure below the flat surface 17 of the flange 16 is of considerable importance in order to ensure that leakage is prevented but that the plug portion can be sheared off against the flange when the closure is to be opened. The optimum residual thickness for shearing is between 0.20 mm and 0.40 mm, though other considerations may make it preferable to use a thickness from 0.125 mm to 0.50 mm.

The preferred thickness of the ring pull is substantially 1.0 mm, though it may vary from 0.50 mm to 1.5 mm.

Alternative forms of the closure according to the invention may be provided with plugs adapted for fitting into apertures of larger diameter than those illustrated in the drawings, e.g. for use on cans for solid or semi-solid food products.

Although a preferred embodiment of the invention has been specifically illustrated and described herein, it is to be understood that minor variations may be made in the method without departing from the spirit and scope of the invention, as defined in the appended claims.

We claim:

1. A metal can end comprising a peripheral flange, a peripheral wall inboard of the peripheral flange, and a central panel inboard of the peripheral wall; a flange extending from the plane of the central panel and defining an aperture therein; said aperture being closed by a closure formed of nylon or polypropylene in situ injection-moulded upon said central panel; said moulded closure including a top surface defining an exterior flange and a pull tab; a plug portion of said moulded closure obturating said aperture; an inner flange of said closure holding said closure in interlocked engagement with said aperture defining flange; said plug portion being adhered to a plastics coating on an interior surface of said central panel; said aperture-defining flange being a generally peripheral wall extending substantially transverse to the plane of the central panel; said aperture-defining flange terminating in a burr directed laterally relative to said aperture; said inner flange having a residual portion set-off between a terminal edge of said aperture-defining flange and an interior surface of said inner flange; said residual portion covering said terminal edge and being in the range of 0.125 mm to 0.5 mm; said residual portion having an opening forming starting end and a last-to-open end remote from said pull tab; said residual portion having a greater thickness at said last-to-open end than at said starting end; and said interior surface plastics coating being a polymer similar to that of said plug closure whereby said plug closure and interior surface coating are bonded and fused into sealing engagement upon the in situ injection-moulding of said moulded closure.

2. The metal can as defined in claim 1 wherein said burr is directed laterally in a direction laterally in a direction away from said aperture.

3. The metal can as defined in claim wherein said aperture-defining flange has a height in the range between one to three times the thickness of said central panel.

4. The metal can as defined in claim 1 wherein said burr is directed laterally in a direction laterally in a direction away from said aperture, and said aperture-defining flange has a height in the range between one to three times the thickness of said central panel.

5. The metal can as defined in claim wherein said aperture-defining flange is of a generally pear-shaped configuration imparting a like generally pear-shaped configuration to said aperture, said pear-shaped flange includes opposite relatively large and small radiused flange portions, and said last-to-open and starting ends are disposed generally at said respective large and small radiused flange portions.

6. The metal can as defined in claim 1 wherein said residual portion thickness is varied in a continuous manner.

7. The metal can as defined in claim 1 wherein said residual portion thickness is varied in a step-wise manner.

8. The metal can as defined in claim 1 including a vent aperture in said central panel adjacent said starting end and remote from said last-to-open end whereby said residual portion thickness increases in a direction away from said vent aperture.

9. The metal can as defined in claim 1 wherein said pull tab is a ring pull having a thickness of 0.50 mm to 1.5 mm.

10. The metal can as defined in claim 1 including a lateral portion of said closure outboard of said residual portion, and said lateral portion has a dimension of 0.25 mm to 2.5 mm.

11. The metal can as defined in claim 4 wherein said aperture-defining flange is of a generally pear-shaped configuration imparting a like generally pear-shaped configuration to said aperture, said pear-shaped flange includes opposite relatively large and small radiused flange portions, and said last-to-open and starting ends are disposed generally at said respective large and small radiused flange portions.

12. The metal can as defined in claim 4 wherein said residual portion thickness is varied in a continuous manner.

13. The metal can as defined in claim 4 wherein said residual portion thickness is varied in a step-wise manner.

14. The metal can as defined in claim 4 including a vent aperture in said central panel adjacent said starting end and remote from said last-to-open end whereby said residual portion thickness increases in a direction away from said vent aperture.

15. A method of forming a tear-opening can end comprising steps of providing a sheet metal blank having inner and outer opposite surfaces with the inner surface having a coating of polymeric material thereon; forming the blank into a can end having a peripheral flange, a peripheral wall inboard of the peripheral flange and a central panel inboard of the peripheral wall; piercing the central panel to form an aperture by passing a punch through the central panel in conjunction with an associated die; forming a laterally projecting burr at a terminal edge of the aperture coincident with the performance of the piercing step; forming a wall portion of the central panel contiguous the aperture into an opening-defining flange by urging a punch against the outer surface of the contiguous wall portion and moving the punch in a direction from the outer surface toward the inner surface whereby the opening-defining flange projects in the outer-to-inner surface direction and generally transverse to the plane of the central panel., providing a mould cavity defined by cavity portions in opposing mould bodies with each cavity portion having a peripheral wall appreciably outboard of the opening-defining flange and an axial wall axially outboard of the outer surface and the terminal edge, respectively, of an associated can end located between the mould bodies, locating a can end between the mould bodies; closing the mould bodies such that the can end is positioned with the opening-defining flange thereof inboard of the mould bodies peripheral walls, the outer surface spaced from an axial wall of one of the mould bodies and the terminal edge closely spaced from the axial wall of the other mould body; injecting polymeric material into the cavity and upon the can end therein to form a polymeric closure including interior and exterior flanges upon the inner and outer surfaces and outboard of the opening-defining flange with a plug portion therebetween and a residual portion adjacent the opening-defining flange terminal edge; the polymeric material of the closure being chosen from a group including nylon or polypropylene and the polymeric material of the inner surface coating being similar thereto thereby effecting in situ bonding, fusion, and hermetic sealing engagement between the closure interior flange and the inner surface coating during the performance of the injecting step; and the thickness of the residue portion being in a range of 0.125 mm to 0.5 mm.

16. The method as defined in claim 15 wherein the piercing punch is passed through the central panel in a direction from the outer surface through the inner surface whereby the burr projects in a direction away from the aperture.

17. The method as defined in claim 15 wherein the opening-defining flange is at an angle of between 70° to 110° to the plane of the central panel.

18. The method as defined in claim 15 wherein the mould body axial walls are generally parallel thereby defining a generally equal thickness of the residual portion about the entirety of the opening-defining flange.

19. The method as defined in claim 15 wherein the mould body axial walls are relatively tapered thereby defining a generally varied thickness of the residual portion about the entirety of the opening-defining flange.

20. The method as defined in claim 15 wherein the mould body adjacent the outer blank surface has a cavity portion which defines a pull tab of the closure, and a pull tab is formed in the pull tab cavity portion coincident with the performance of the in situ injection-moulding step.

21. The method as defined in claim 15 wherein the mould body adjacent the outer blank surface has a cavity portion which defines a pull tab of the closure, a pull tab is formed in the pull tab cavity portion coincident with the performance of the in situ injection-moulding step, and the pull tab is not bonded to the blank outer surface at the completion of the performance of the in situ injection-moulding step.

22. The method as defined in claim 15 wherein the performance of the piercing step forms a pear-shaped aperture having ends of differing radii and the performance of the in situ injection moulding step is effected in such a manner that the thickness of the residual portion is greatest adjacent the larger radius of the pear-shaped aperture.

23. The method as defined in claim 15 wherein the opening-defining flange has a height in the range of one to three times the thickness of the central panel.

24. The method as defined in claim 15 wherein the opening-defining flange projects beyond the plane of the can end in the range of 0.25 mm to 2.5 mm.

25. The method as defined in claim 15 wherein the total height of the flange is in the range 2t to 5t wherein "t" is the thickness of metal.

* * * * *